May 22, 1973   D. W. GRIFFITH   3,734,795

PATCH AND SEAM FOR PLASTIC BELTS

Filed April 23, 1971   3 Sheets-Sheet 1

INVENTOR.
DAVID W. GRIFFITH
BY
Teare, Teare & Sammon
ATTORNEYS

May 22, 1973　　　D. W. GRIFFITH　　　3,734,795
PATCH AND SEAM FOR PLASTIC BELTS
Filed April 23, 1971　　　3 Sheets-Sheet 2

INVENTOR.
DAVID W. GRIFFITH
BY
Teare, Teare & Sammon
ATTORNEYS

INVENTOR.
DAVID W. GRIFFITH

United States Patent Office 3,734,795
Patented May 22, 1973

3,734,795
PATCH AND SEAM FOR PLASTIC BELTS
David W. Griffith, South Euclid, Ohio, assignor to The Lindsay Wire Weaving Company, Cleveland, Ohio
Filed Apr. 23, 1971, Ser. No. 136,952
Int. Cl. B32b 35/00; B29c 19/06
U.S. Cl. 156—98    3 Claims

ABSTRACT OF THE DISCLOSURE

Two portions of woven fabric containing polymeric plastic material are joined together by passing a current of electricity through a current conducting member, which is in contact with the polymeric plastic material, until the member is heated sufficiently to soften the polymeric plastic material and embed the conducting member therein. One article may be a section of woven polymeric plastic material which serves as a patch for a hole in woven polymeric plastic fabric or as a seam for a Four-drinier paper making machine. The invention includes a method as well as the portions joined by the method.

BACKGROUND OF THE INVENTION

The present invention relates to a method for joining together two articles or portions of woven material which utilize polymeric plastic strands, or strands which are coated with polymeric plastic material. The invention is particularly useful in patching a hole in a paper making machine endless belt and for joining the opposing ends of a strip of woven fabric to make a seam for such belt.

A problem which has been encountered in the use of endless paper making belts, such for example as are used on Fourdrinier paper making machines, is that of patching a hole in the belt without removing the belt from the machine. It has been found that foreign matter can get into the stock system of the paper making machine and can cause a hole or a damaged area, which though small, can cause the removal of an expensive belt and a substantial loss of paper machine production.

Heretofore, a method of patching paper making belts composed of polymeric plastic material has included the use of adhesives, but they are unsatisfactory because of the time required for curing the material and because of the short shelf life of the adhesives. Additionally, the adhesive tends to fill the interstices in the fabric and thus causes excessive sheet marking on paper which is formed over the patched area. A further difficulty has been the inability of the patch to be effective for the desired length of time.

Another type of patch has been to apply heat from a modified soldering iron on which the tip has been machined to a long, fine point at the junction of the patching material and the fabric of the belt, thereby fusing the two together. Such procedure has been unsatisfactory because it is time consuming and has resulted in poor drainage in the region of the overlap fused material.

SUMMARY OF THE INVENTION

The present invention contemplates a method and article which overcomes the foregoing difficulties and which may be quickly applied and which will possess adequate mechanical strength to effect a junction with a minimum of clogging the interstices of the belt and/or without marking the paper in an objectionable degree.

The invention is particularly applicable to repairing holes or damaged areas in endless belts or cylinders which are used on paper making machines, wherein the fabric is woven of polymeric plastic strands or monofilaments, or wherein the woven strands comprise metallic wires which are coated with polymeric plastic material.

The invention may be applicable for joining together the ends of a woven fabric, the strands of which contain polymeric plastic material and the ends of which are brought together to make a seam and thereby form a belt.

The present invention enables a patch or seam to be made quickly and effectively, thereby reducing the time consumed and the cost of making a repair or in making or repairing a seam. An advantage of utilizing the present invention for repairing any damaged area in the paper making belt is that the repair can be made quickly without removing the belt from the machine and that it will remain in place for a sufficient length of time to finish the stock run, and thus to permit removal of the belt at a time which is coordinated with production requirements.

The invention is carried out by embedding a fine current conducting wire in the polymeric plastic material of the parts to be joined, by bringing the parts into close proximity to each other and in contact with a current conducting member, through which a current of electricity is passed until the member is heated sufficiently to soften the plastic material and cause it to unite and embed the wire within it. The current conducting member extends across multiple warp and weft strands of both parts to be joined and comprises a fine wire which will not fill the interstices of the woven parts yet will have adequate mechanical strength to hold the parts together. Several forms of the invention are illustrated in the drawings and are described in the following specification.

DESCRIPTION OF THE PREFERRED EMBODIMENTS

Figure 1:
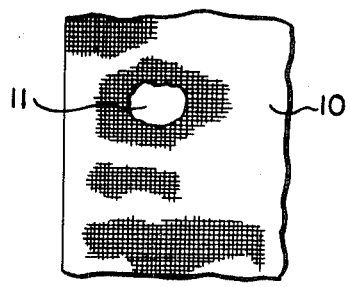
FIG. 1 is a top plan view of a piece of woven material which has been damaged by the formation of a hole in it.
Figure 2:
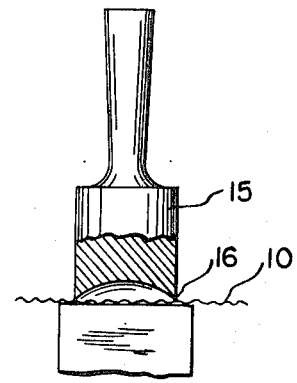
FIG. 2 is a side view illustrating a tool for cutting a circular hole around that formed in the damaged fabric illustrated in FIG. 1.
Figure 3:
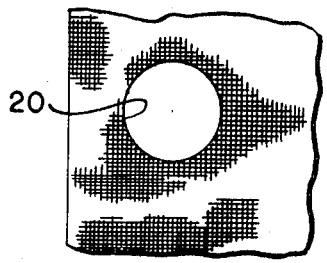
FIG. 3 is a plan view illustrating the shape of the hole after the fabric has been cut with the tool illustrated in FIG. 2.

The present invention is particularly suited for use in joining together two parts of woven material wherein the warp and weft strands contain polymeric plastic material. One such part is illustrated in FIG. 1 as a section of woven fabric 10 which forms a part of a drainage belt on a paper making machine and which has been damaged, and is illustrated by the hole 11. Usually such holes or damaged areas have irregular edges which make it difficult to repair the fabric without clogging the interstices of the fabric to an objectionable degree.

To prepare the damaged fabric for patching the hole, the fabric around the periphery of the hole is cut to a regular shape, such as a circle, by means of a tool 15 which has a circular cutting edge 16 that is brought into engagement with the fabric. The diameter of the cutting edge exceeds the largest dimension of the hole 11 so that the resulting hole 20 is regular in shape. Such hole is adapted to receive another woven part 25, FIG. 4, which is complementary in shape to the hole 20 and which has warp and weft strands containing polymeric plastic material and preferably corresponding to the pattern of weave in the fabric 10.

Figure 4:
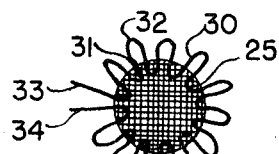
FIG. 4 is a top plan view of one part of woven material shaped to fit into the hole illustrated in FIG. 3 and having a current conducting member superimposed thereon.

As shown in FIG. 4, the patch 25 has a current conducting wire 30 formed preferably in sets of inner loops 31 and outer loops 32, which extend around the periphery of the patch continuously with terminals 33 and 34, respectively. In one form of the invention, the terminals 33 and 34 have been connected to a source of current supply and a current of electricity has been passed through the wire until it has been heated sufficiently to soften the polymeric plastic material of the patch sufficiently to embed it in such material, whereby the patch and conductor will comprise a unitary structure which can be conveniently preassembled and stored for future use.

Figure 5:
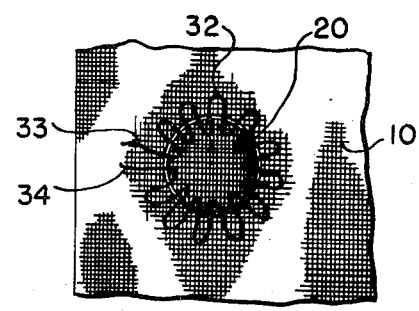
FIG. 5 is a top plan view of the part shown in FIG. 4 fitted into the hole illustrated in FIG. 3 with that portion of the current conducting member which extends beyond the periphery of the insert engaging the fabric and overlapping the same.

FIG. 5 illustrates the position of the patch 25 when inserted within the hole 20 wlithin the fabric, with the outer loops 32 overlying the warp and weft strands of the fabric. The terminals 33 and 34 are then connected to a source of current supply and the current is impressed upon the wire until it is heated sufficiently to soften the polymeric plastic material on the fabric and embed the outer loops within it. Pressure is applied against the wire, such as by means of a flat block of electric insulating material while the current is passing through it, so as to ensure engagement between the wire and the strands of plastic material. At the completion of the operation, the terminals 33 and 34 may be trimmed off close to the fabric.

The warp and weft strands of the fabric and patch may be made of any suitable polymeric plastic material or the strands may comprise metal wires which are coated with such polymeric plastic material. Additionally, the conducting wire 30 may comprise a bare wire or it may be coated with a polymeric plastic material, such as a polyester or a polyamide. For example a suitable polyester is presently marketed under the trade name Trivera by Hoechst Polymer Corporation of Delaware City, Del., and a suitable polyamide is nylon. In the latter case, the heating of the wire would soften the plastic material on it and would also soften the plastic material on the fabric and patch and cause the plastic material to unite so as to form a bond between the conducting wire and the woven material.

As applied to a paper making machine drainage belt, the diameter of the wire should be sufficiently small so that the paper which is formed above the patch will not be marked to an objectionable degree. The diameter of the wire may be varied in accordance with the mesh of the fabric and as an example a nylon coated brass wire having a wire diameter of .006 inch and an overall diameter of .0083 inch has been used on a semi-twill woven fabric having 54 polymeric plastic warp strands having a diameter of .0108 inch to the inch and 40 polymeric plastic weft strands to the inch, each having a diameter of .012 inch. Alternatively, the member 30 may be made of any current conducting material, such as bronze, tungsten, copper, glass fiber, or carbon filament with or without a coating of polymeric plastic material thereon. In any case, such current conducting member should have sufficient resistance to the flow of current therethrough to generate enough heat to soften the plastic material.

Figures 12, 14:
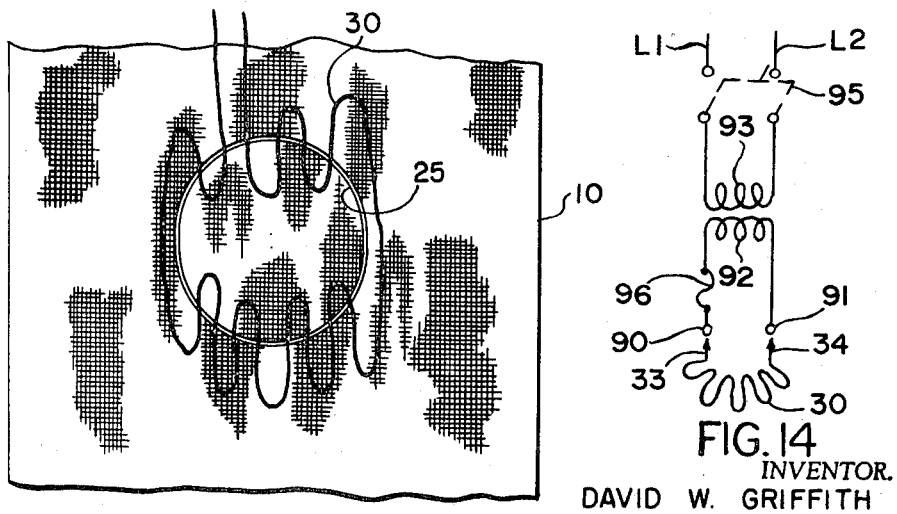
FIG. 12 is a top plan view of a portion of a fabric corresponding to that in FIG. 5 but on a larger scale and illustrating a modified arrangement of the current carrying conductor which engages the two parts of woven material to be joined together.
FIG. 14 is a wiring diagram.

In FIGS. 4 and 5, the conducting wire 30 is shown as extending substantially radially of the patch 25, but in FIG. 12 the loops extend around the patch but generally in the same direction as the warp wires of the fabric 10. This latter arrangement is intended to offer improved resistance to tension forces which act upon the belt during use.

FIG. 14 comprises a wiring diagram for heating the wire 30 to soften the polymeric plastic material. In such diagram the wire 30 has its terminals 33 and 34 connected to the terminals 90 and 91 xtending from the secondary coil 92 of a variable transformer. The primary coil 93 is adapted to be connected to a source 110 volt alternating current supply L1 and L2 by a switch 95 and the transformer is adjusted to supply a voltage of 20 to 48 volts. A ten ampere fuse 96 is sufficient to limit the curent flowing through the wire, which becomes heated to the desired degree, almost instantaneously, whenever the current is caused to flow through it.

Figure 15:
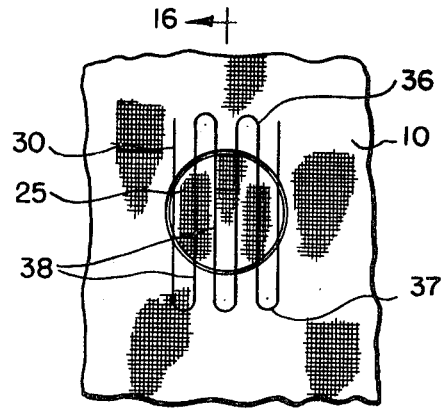
FIG. 15 is a top plan view of a modified form of patch construction.
Figure 16:
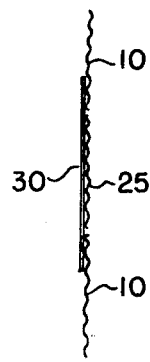
FIG. 16 is an end view of the form shown in FIG. 15.

In FIG. 15 a modified form of the invention is illustrated wherein the current conducting member 30 is disposed in substantially uniform loops which terminate substantially in rows 36 and 37, respectively on opposite sides of the patch 25. The reaches 38 of the member 30 between the rows 36 and 37 are substantially parallel to each other and extend across the patch and in the same general direction as the warp strands of the fabric 10.

Figure 17:
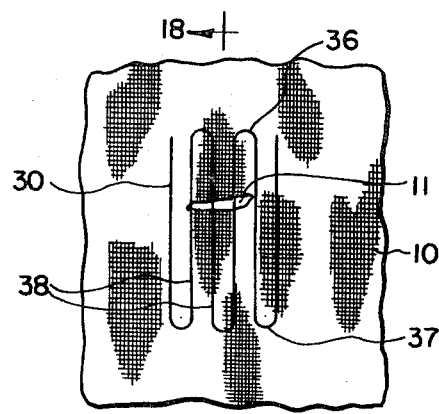
FIG. 17 is a top plan view of another modified form of patch construction.
Figure 18:
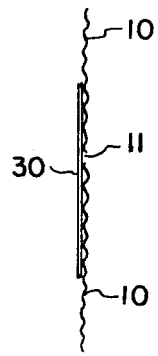
FIG. 18 is an end view of the form shown in FIG. 17.

In FIG. 17 a further modification is shown wherein the hole 11 is relatively small and wherein the repair is made by utilizing a current conducting member 30 in the form shown in FIG. 15, with the rows of loops 36 and 37, respectively, being disposed on opposite sides of the hole and with the reaches 38 extending in the same general direction as the warp strands of the fabric 10. In this form of the invention, a woven patch 25 is not utilized, but the form is limited to instances where the defect is relatively small and is more akin to a puncture in the fabric.

Figure 19:
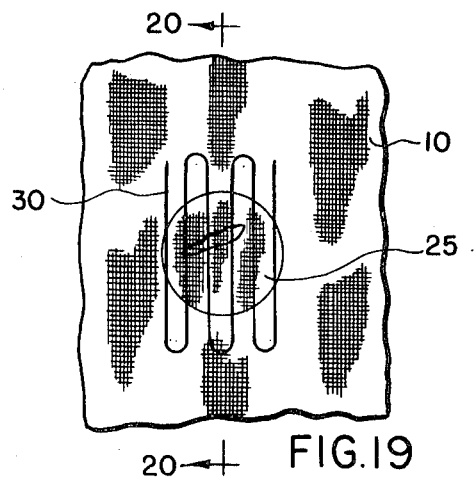
FIG. 19 is a top plan view of a further modified form of patch construction.
Figure 20:
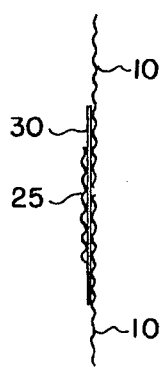
FIG. 20 is an end view of the form shown in FIG. 19.

In FIG. 19 another modification is illustrated for repairing a defect of the order of that illustrated in FIG. 17. In this form of the invention the conducting member 30 is interposed between the fabric 10 and a woven patch 25. The form of the wire shown is that of FIGS. 15 and 17, but the repair is reinforced by the utilization of a patch which is united to the body of the fabric whenever the polymeric material is softened by the application of a current of electricity to the current conducting member 30.

An advantage of the present invention is that, as applied to a repair for damage to the drainage belt of a paper making machine, the repair can be accomplished with a minimum of machine shut-down time and yet can be readily applied by paper mill personnel in an expeditious manner. A further advantage is that the items which are utilized in making the repair can be supplied in the form of a kit to the paper mill and that the repair can be made without the necessity for the seam forming expertise of the belt manufacturer.

Figure 6:
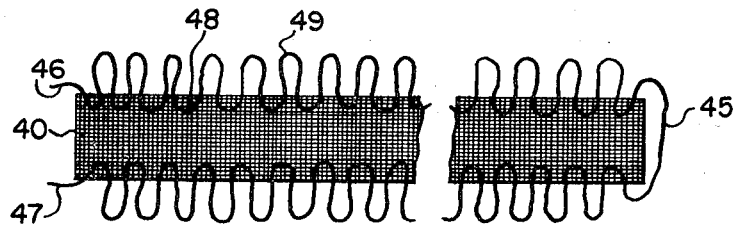
FIG. 6 is a top plan view of a woven strip which is provided with a current conducting member and is intended to be interposed between the ends of the fabric and to be joined to such ends so as to make a belt for a paper making machine.

The present invention is also intended for use in the making of a seam for a drainage belt in a paper making machine and for such purpose several forms are illustrated in the drawings. In one form, as shown in FIG. 6, a strip 40 of woven material, the warp and weft strands of which contain polymeric plastic material, has a current conducting wire 45, with terminals 46 and 47, formed into inner and outer loops 48 and 49, respectively, wherein the inner loops are embedded within the plastic material of the strip as described in connection with the conducting wire 30 (FIG. 4). The loops on the strip, as shown, extend across multiple warp strands and multiple weft strands of the strip.

Figure 7:
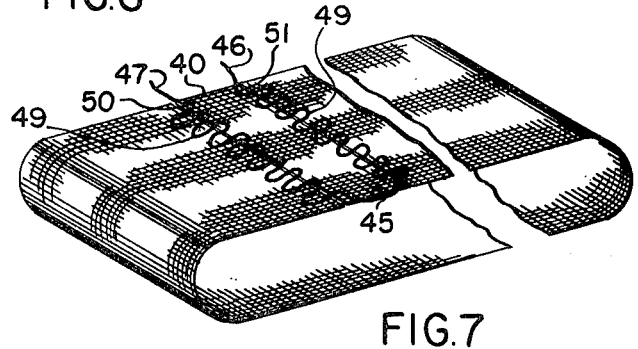
FIG. 7 is a perspective view illustrating an endless belt having a seam made by utilizing a strip illustrated in FIG. 6.

In FIG. 7, the strip 40 is shown as being interposed between the ends 50 and 51 of the woven fabric, with the outer loops 49 of the wire 45 in overlapping engagement with multiple warp strands and multiple weft strands. The terminals 46 and 47 are then connected to a source of current supply and current is impressed upon the wire, while at the same time pressure is exerted against the loops of the wire so as to embed it within the softened plastomeric material. At the completion of the operation, the terminals 46 and 47 are trimmed off close to the edge of the belt. In this form of the invention, the strip preferably has a weave pattern and size of warp and weft strands to conform to the weave pattern and size of strands in the fabric of which the belt is made. The conducting wire then operates to connect the ends of the fabric to the strip and thereby to make a seam for the belt.

Figures 8, 9:
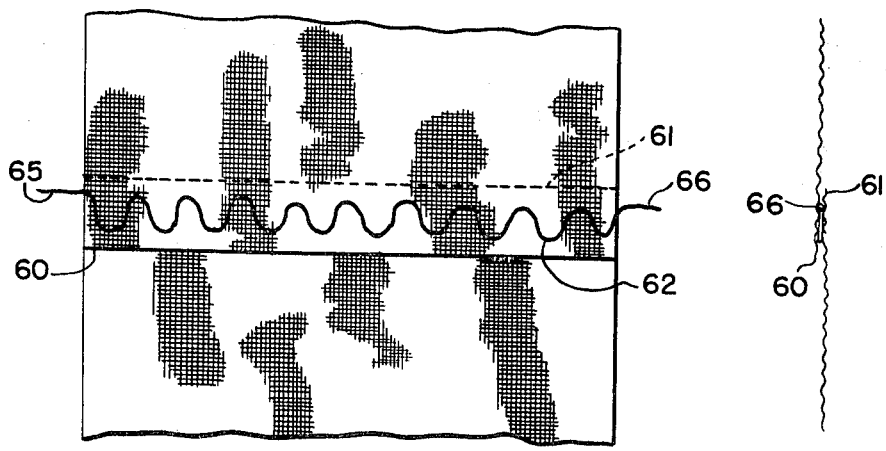
FIG. 8 is a top plan view of a portion of a belt which is formed by overlapping the ends of the fabric with a current conducting member interposed therebetween.
FIG. 9 is an end view of the fabric and seam illustrated in FIG. 8.

A modified form of construction is illustrated in FIG. 8, wherein one end 60 of the fabric overlaps the other end 61 and wherein the current conducting wire 62 is interposed between the overlapping portions of the fabric and is formed in loops with terminals 65 and 66 extending from the edges of the fabric and with loops extending across multiple warp and weft strands. In this form of the invention, when a current is impressed upon the wire 62, the polymeric plastic material in the region of the wire is softened, at which time the overlapping portions are pressed together, whereupon the plastic material on one part unites with the plastic material on the other part to form a joint and embed the conducting wire within the plastic material.

Figures 10, 11:
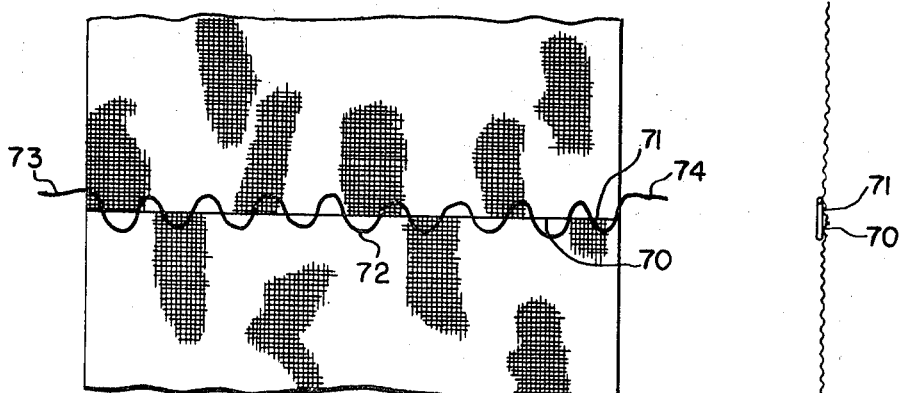
FIG. 10 is a top plan view of a portion of a paper making machine belt wherein the ends of the fabric are in abutting engagement and the seam is made by means of an electric current conducting member which bridges the gap between the ends of the fabric.
FIG. 11 is a side view of the ends of the fabric illustrated in FIG. 10.

A further modified form of the invention is shown in FIGS. 10 and 11, wherein one end 70 of the fabric is brought into abutting engagement with the other end 71, and wherein the conducting wire 72 is formed into loops which extend across the joint and across multiple warp and weft strands on each end of the fabric. The terminals of the wire 72 are indicated at 73 and 74 and are connected to a source of current supply. The current is impressed upon the wire for a sufficient length of time to soften the plastic material and at the same time, pressure is exerted upon the wire to force it into the material and thereby to embed the wire in such material.

Figure 13:
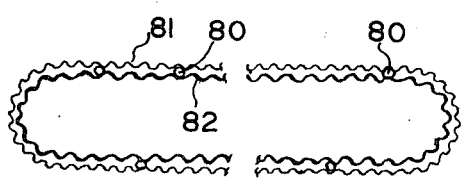
FIG. 13 is an end view of an outer, finely woven paper making belt which is supported by an inner coarsely woven belt and is attached thereto by means of the present invention.

A further use of the invention is to use an electrically conductive wire 80 as a heat source to attach a finely woven drainage belt 81, wherein the warp and weft strands contain polymeric plastic material, to a coarsely woven drainage belt 82, having warp and weft strands containing polymeric plastic material, which is positioned inside the finely woven belt, as shown in FIG. 13. Such construction would allow the coarsely woven belt to withstand the tensions and abrasions of the paper machine, while the finer woven belt applied to its surface could be freely designed as required for proper paper making. In such case, a wire 80 is interposed between the two belts and, when heated, would unite the plastic material so as in effect to weld the two belts together. A plurality of such independent wires would be embedded at spaced intervals in order to retain the belts in proper position with respect to each other.

I claim:
1. A method of repairing a hole in a woven fabric having warp and weft strands at least some of which contain polymeric plastic material comprising,
   forming a patch of woven polymeric plastic material which is substantially similar in weave pattern to that of the woven fabric,
   cutting the fabric around the hole to form an opening which is complementary to the shape of the patch,
   embedding an electric current conducting member in sinuous form within the patch and around the periphery thereof with portions of the member projecting beyond the periphery thereof,
   placing the patch within the opening with the projecting portions of the conducting member overlying the fabric, passing a current of electricity through the member until it is heated sufficiently to soften the polymeric plastic material of the fabric, and
   pressing the member against the softened polymeric material to embed the conducting member into it.
2. A method according to claim 1 wherein the opening which is cut in the fabric has a circular form and wherein the patch is placed within the opening so as to maintain across the patch the orientation of the pattern weave of the fabric.
3. A method according to claim 1 wherein the conducting member is arranged in repeated loops with alternate loops lying within the confines of the patch and in said projecting portions respectively.

References Cited
UNITED STATES PATENTS
3,271,217    9/1966    Mapson _____ 156—98
3,513,048    5/1970    Synder _____ 156—98

DOUGLAS J. DRUMMOND, Primary Examiner

U.S. Cl. X.R.
156—275, 304